(12) United States Patent
Rasmusson et al.

(10) Patent No.: US 10,878,533 B2
(45) Date of Patent: Dec. 29, 2020

(54) METHOD AND DEVICE FOR DEMOSAICING OF COLOR IMAGES

(71) Applicant: SONY MOBILE COMMUNICATIONS INC., Tokyo (JP)

(72) Inventors: Jim Rasmusson, Vellinge (SE); Stefan Petersson, Lyckeby (SE); Håkan Grahn, Karlskrona (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 296 days.

(21) Appl. No.: 16/067,893

(22) PCT Filed: Jan. 21, 2016

(86) PCT No.: PCT/EP2016/051270
§ 371 (c)(1),
(2) Date: Jul. 3, 2018

(87) PCT Pub. No.: WO2017/125162
PCT Pub. Date: Jul. 27, 2017

(65) Prior Publication Data
US 2020/0265551 A1 Aug. 20, 2020

(51) Int. Cl.
*G06T 3/40* (2006.01)
(52) U.S. Cl.
CPC ................... *G06T 3/4015* (2013.01)
(58) Field of Classification Search
None
See application file for complete search history.

(56) References Cited

U.S. PATENT DOCUMENTS

| 3,971,065 A | 7/1976 | Bayer |
| 4,630,307 A | 12/1986 | Cok |

(Continued)

FOREIGN PATENT DOCUMENTS

| WO | 00/16261 A1 | 3/2000 |
| WO | 2008/086037 A2 | 7/2008 |

OTHER PUBLICATIONS

Malvar, Henrique S. et al., "High-Quality Linear Interpolation for Demosaicing of Bayer-Patterned Color Images," Microsoft Research, published in ICASPP, 2004.

(Continued)

*Primary Examiner* — Fayyaz Alam
(74) *Attorney, Agent, or Firm* — Tucker Ellis LLP

(57) ABSTRACT

Techniques for demosaicing of digital color images are improved by estimating and using the structural instability in the neighborhood of the respective pixel. The structural instability for a color is given by the range of the color values for this color in a first local region around each current pixel. A method is executed by a device for interpolating a missing color at the current pixel in a color image produced by a digital image sensor having a color filter array, the current pixel having a current color that differs from the missing color. The method comprises: computing (51) a range value for one of: pixels having the missing color and pixels having the current color; computing (52) an interpolation value at the current pixel as a function of the range value and color values for pixels having the missing color within a second local region around the current pixel; and setting the missing color at the current pixel to the interpolation value.

18 Claims, 6 Drawing Sheets

(56) References Cited

U.S. PATENT DOCUMENTS

| | | | |
|---|---|---|---|
| 4,642,678 A | 2/1987 | Cok | |
| 5,382,976 A | 1/1995 | Hibbard | |
| 7,289,665 B2* | 10/2007 | Ishiga | G06T 3/4015 |
| | | | 348/E9.01 |
| 7,499,089 B2* | 3/2009 | Matsutani | H04N 9/045 |
| | | | 348/273 |
| 2004/0032516 A1* | 2/2004 | Kakarala | G06T 7/0004 |
| | | | 348/246 |
| 2004/0218073 A1* | 11/2004 | Kalevo | H04N 9/045 |
| | | | 348/272 |
| 2005/0201616 A1 | 9/2005 | Malvar | |
| 2012/0206582 A1* | 8/2012 | DiCarlo | A61B 1/0005 |
| | | | 348/71 |

OTHER PUBLICATIONS

Duchon, Claude E., "Lanczos Filtering in One and Two Dimensions," published in Journal of Applied Meteorology, vol. 18, pp. 1016-1022, Aug. 1979.

International Search Report from corresponding International Patent Application No. PCT/EP2016/051270, dated Oct. 14, 2016.

* cited by examiner

METHOD AND DEVICE FOR DEMOSAICING OF COLOR IMAGES

TECHNICAL FIELD

The present invention relates generally to digital image processing, and particularly to demosaicing techniques for interpolating colors at each pixel location.

BACKGROUND ART

Digital color image sensors are predominately of two types: CCDs (Charge Coupled Devices) and CMOS-APS (Complementary Metal Oxide Semiconductor-Active Pixel Sensors). Both types of sensors typically contain an array of photo-detectors (pixels), arranged in rows and columns, that sample color within an image. An image sensor can only generate information about a single color at a given pixel. A color image, however, is represented by combining three separate monochromatic images. In order to display a color image, three primary color values are needed at each pixel, red (R), green (G) or blue (B), or cyan (C), magenta (M) and yellow (Y). In a single-sensor digital camera, a color filter array (CFA) may be placed in front of the image sensor, e.g. the CFA described in U.S. Pat. No. 3,971,065 to Bayer, which is hereby incorporated by reference, such that each pixel sees only one of three primary colors. An image sensor fitted with a CFA thus produces a mosaiced image which is sampled in both the color space and in the spatial domain. This mosaiced image has only one color value at each of its pixels. In order to obtain the other two missing colors at each pixel, a technique must be used to estimate or interpolate the missing colors from surrounding pixels in the image. This class of estimation and interpolation techniques is called "demosaicing".

Known demosaicing methods include, for example, pixel replication and bilinear interpolation. In pixel replication, each missing color value of a particular color channel is taken from the nearest neighbor of the same color channel. Bilinear interpolation offers some improvement over pixel replication with a moderate increase in complexity. In the bilinear interpolation method, each missing color value of a particular color channel is calculated based on an average of the neighboring pixel values in the same color channel. More complex methods that interpolate independently within each color plane include bicubic interpolation, spline interpolation, and Lanczos resampling.

While these techniques are fast, computationally non-intensive and easy to implement, they are also notorious for producing low-quality image due to the significant artifacts they generate, such as blurriness, false colors, jagged edges (so-called "zipper effect") and color fringing (aliasing).

The prior art also includes interpolation techniques that seek to improve the quality of the demosaiced image by taking into account a correlation between the color channels. One such interpolation technique is smooth hue transition interpolation, e.g. as disclosed in U.S. Pat. No. 4,642,678. This technique treats the mosaiced image as consisting of a luminance channel (e.g. green pixels) and chrominance channels (e.g. red and blue pixels, respectively), and interpolates the luminance and chrominance channels differently. The luminance channel is first reconstructed by interpolation among the green pixels, e.g. by bilinear interpolation. Hue values are then formed by dividing the red and blue values by the corresponding green values, and the hue values are then interpolated for red and blue pixels, respectively, to generate interpolated hue values, which are then converted to interpolated red and blue values given the corresponding green values in the reconstructed luminance channel.

Another such interpolation technique is gradient-corrected bilinear interpolation disclosed in US2005/0201616 to Malvar et al, which proposes to generate an interpolation value by linearly combining a bilinear interpolation of the missing color with a correction term that estimates the local gradient in the color plane of the current pixel. Specifically, the correction term is given by a gain factor multiplied by the difference between the color value of the current pixel and the average of the color values of the nearest pixels in the same color plane. By applying a Wiener approach to a typical image data set, optimal gain values have been determined.

The prior art also comprises various adaptive demosaicing algorithms, which are designed to detect local spatial features present in the pixel neighborhood and decide, based on the detected local spatial feature, on a specific predictor to use for predicting the missing color value. One such adaptive technique is edge sensing interpolation described in U.S. Pat. No. 5,382,976, in which the missing color value is interpolated in different ways depending on the relative magnitude of two classifiers, namely the absolute difference between the two neighboring color values in the horizontal direction and the vertical direction, respectively, in the color plane of the missing color value. Another adaptive technique is pattern recognition interpolation, e.g. as disclosed in U.S. Pat. No. 4,630,307.

It should be understood that there is a tradeoff between computational complexity and interpolation performance for demosaicing methods. For example, adaptive algorithms may yield superior performance, but are generally complex and processing intensive. In particular for real-time digital image processing, there is a general desire to find a demosaicing technique that yields adequate quality of the resulting demosaiced images at a reasonable computational cost. Demosaicing is only one of many operations to be executed in a digital image processing pipeline, and demosaicing may typically only consume a fraction of the available processing power. The desire to economize with processing power is also driven by the fact that image sensors are produced with an ever increasing number of pixels and that the processing cost scales with the number of pixels. Further, the demosaicing may need to be fast if a large number of pixels need to be processed per unit time, e.g. when processing images in a video stream. The need to restrict processing cost and power consumption may be particularly pronounced when demosaicing is to be performed on handheld devices, such as mobile phone and digital cameras.

As understood from the foregoing, there is a general desire to find a simple way to improve the performance of existing demosaicing techniques with only minor increase, if any, in computational complexity and cost.

BRIEF SUMMARY

It is an objective of the invention to at least partly overcome one or more limitations of the prior art.

Another objective is to provide a technique for demosaicing digital images that improves performance with no more than a minor increase in computational complexity and cost.

A further objective is to provide a technique suitable for real-time processing of digital images.

One or more of these objectives, as well as further objectives that may appear from the description below, are at least partly achieved by a computer-implemented method for interpolating a missing color, a computer-readable medium, and a device for interpolating a missing color according to the independent claims, embodiments thereof being defined by the dependent claims.

A first aspect of the invention is a computer-implemented method for interpolating a missing color at a current pixel in a color image produced by a digital image sensor having a color filter array, the current pixel having a current color that differs from the missing color. The method comprises: computing a range value for color values of pixels within a first local region around the current pixel, said range value being computed for one of: pixels having the missing color and pixels having the current color; computing an interpolation value at the current pixel as a function of the range value and color values for pixels having the missing color within a second local region around the current pixel; and setting the missing color at the current pixel to the interpolation value.

Additionally, in some embodiments, computing the range value comprises: identifying a largest color value and a smallest color value among the color values for the pixels within the first local region, and computing a difference between the largest and smallest color values.

Additionally, in some embodiments, the interpolation value is computed by a predefined color estimation function which is modified based on the range value.

Additionally, in some embodiments, the predefined color estimation function comprises an interpolation function operating on the color values for the pixels having the missing color within the second local region.

Additionally, in some embodiments, the predefined color estimation function further comprises a correction function which is combined with the interpolation function and operates to generate a color correction value, wherein the range value is applied to modify the color correction value or the correction function.

Additionally, in some embodiments, the correction function operates to generate the color correction value based on the color values of the pixels having the current color within the second local region.

Additionally, in some embodiments, the correction function operates to estimate a color gradient for the current color within the second local region.

Additionally, in some embodiments, computing the range value comprises: computing a first range value as a function of the color values for the pixels having the missing color within the first local region, and computing a second range value as a function of the color values for the pixels having the current color within the first local region, and wherein the color correction value or the correction function is modified as a function of the first and second range values.

Additionally, in some embodiments, the color correction value or the correction function is modified as a function of a ratio of the first and second range values.

Additionally, in some embodiments, the color correction value is modified by a scaling factor given by the smallest of 1 and a value representing the ratio of the first and second range values.

Additionally, in some embodiments, the range value is applied to modify the interpolation function.

Additionally, in some embodiments, the interpolation function operates to combine the color values for the pixels having the missing color within the second local region using interpolation coefficients, and wherein one or more of the interpolation coefficients are modified as a function of the range value.

Additionally, in some embodiments, the extent of interpolation function within the second local region is modified as a function of the range value.

Additionally, in some embodiments, the predefined color estimation function operates to, as a function of the range value, select between different interpolation functions for computing the interpolation value at the current pixel, and/or selectively include or exclude processing operations when computing the interpolation value at the current pixel.

Additionally, in some embodiments, each of the first and second local regions have a predefined extent and are centered at the current pixel.

Additionally, in some embodiments, the color image is a Bayer image.

A second aspect of the invention is a computer-readable medium comprising computer instructions which, when executed by a processor, cause the processor to perform the method of the second aspect or any of its embodiments.

A third aspect of the invention is a device for interpolating a missing color at a current pixel in a color image produced by a digital image sensor having a color filter array, the current pixel having a current color that differs from the missing color. The device is configured to: compute a range value for color values of pixels within a first local region around the current pixel, said range value being computed for one of: pixels having the missing color and pixels having the current color; compute an interpolation value at the current pixel as a function of the range value and color values for pixels having the missing color within a second local region around the current pixel; and set the missing color at the current pixel to the interpolation value.

The device of the third aspect may alternatively be defined to comprise: means for computing a range value for color values of pixels within a first local region around the current pixel, said range value being computed for one of: pixels having the missing color and pixels having the current color; means for computing an interpolation value at the current pixel as a function of the range value and color values for pixels having the missing color within a second local region around the current pixel; and means for setting the missing color at the current pixel to the interpolation value.

The second and third aspects share the advantages of the first aspect. Any one of the above-identified embodiments of the first aspect may be adapted and implemented as an embodiment of the second and third aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Embodiments of the present invention generally relate to a technique or algorithm for demosaicing of digital images captured by an image sensor fitted with a color filter array (CFA). The demosaicing algorithm may be implemented by any digital imaging device, such as a digital camera, video camera, mobile phone, medical imaging device, etc. On the digital imaging device, the demosaicing algorithm may be operated on-line to process images in real-time, i.e. the demosaicing algorithm receives a stream of images from an image sensor and produces a corresponding stream of processed images for display or further processing. The demosaicing algorithm may also be operated off-line on the digital imaging device for post-processing of stored images. The demosaicing algorithm need not be implemented on a digital imaging device, but could be implemented on any type of computer system, such as a personal computer or server, for processing digital images captured by an image sensor fitted with a color filter array (CFA).

Figure 1:
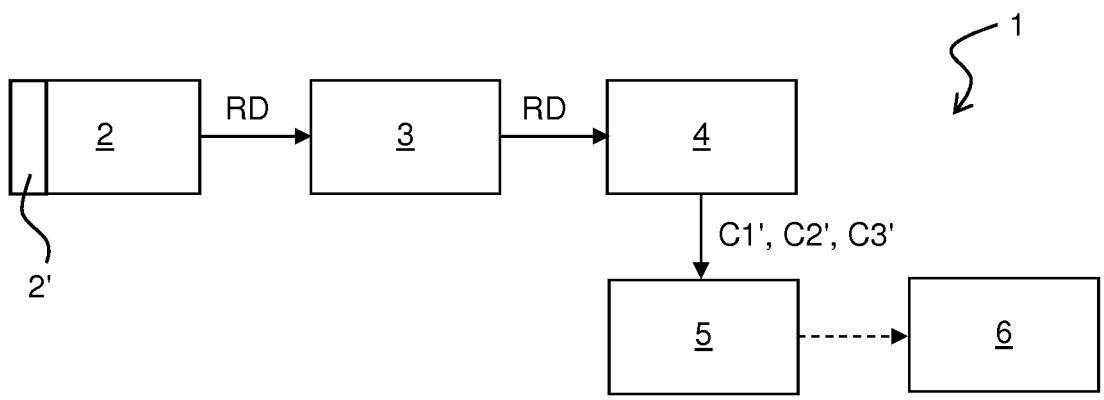
FIG. 1 is a block diagram of a digital camera system utilizing a demosaicing technique in accordance with exemplary embodiments of the present invention.
Figure 2:
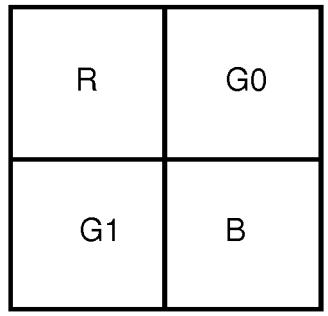
FIG. 2 illustrates an exemplary filter unit of a color filter array.

FIG. 1 shows a digital camera system 1 which implements a demosaicing technique in accordance with the present invention for on-line processing of raw data RD produced by a digital image sensor 2. The digital image sensor 2, e.g. a CMOS sensor chip or a CCD sensor chip, includes a two-dimensional array of pixels arranged in rows and columns. The digital image sensor 2 has a color filter array (CFA) 2', which covers the two-dimensional array of pixels such that each pixel senses only one color. For example, the CFA 2' may be a Bayer CFA, in which chrominance colors (red and blue) are interspersed amongst a checkerboard pattern of luminance colors (green). A Bayer CFA is formed by tiling a filter unit across the image sensor to cover a respective group of pixels. An example of such a filter unit covering 2×2 pixels is shown in FIG. 2. As seen, the filter unit is made up of two green filters G0, G1, one red filter R and one blue filter B. It should be understood that the filter unit in FIG. 2 is merely given as an example to be used in the following description of embodiments of the present invention. For example, other arrangements of the filters G0, G1, R, B within the filter unit are conceivable, and the Bayer CFA may alternatively be defined to separate incoming light into other color spaces, such as CMY (cyan, magenta, yellow). Generally, the image sensor 2 may be provided with any type of CFA 2' that causes the image sensor 2 to produce raw data in the form of a mosaiced image, including but not limited to CYGM filters, RGBE filters, etc in which the filter units may have any size (3×3, 4×4, etc). Such variants are well-known to the person skilled in the art and will not be further described herein.

Figure 3:
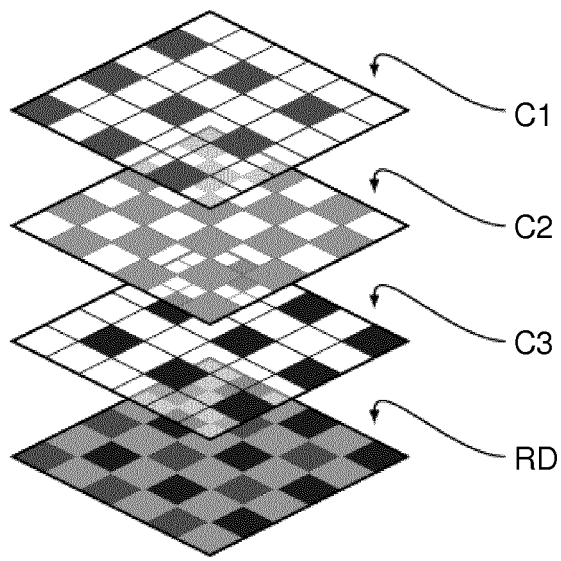
FIG. 3 illustrates a mosaiced color image and its constituent color planes.

For the Bayer CFA 2' formed by the filter unit in FIG. 2, the digital image sensor 2 produces raw data RD containing the original red, blue and green pixel values. Such raw data RD is thus a mosaiced image, also known as a "Bayer image" when originating from a Bayer CFA. As shown in FIG. 3, the mosaiced image RD may be seen to be formed by three separate and superimposed color planes C1, C2, C3 (i.e. R, G and B). In the digital camera system 1 of FIG. 1, the raw data RD is provided to a digital processing arrangement 4 which applies a demosaicing algorithm to the raw data RD in order to interpolate the pixel values to obtain red, green and blue values at each pixel location. The raw data RD is typically provided to the digital processing arrangement 4 in blocks at a time. Thus, the raw data RD may be stored in a buffer 3 until the requisite amount of raw data RD is present to begin processing by the digital processing arrangement 4. The amount of raw data RD needed to begin processing depends on the type of processing. For example, pixel values are typically read off the sensor 2 one row at a time. For a neighborhood interpolation of a given pixel to begin, at least one horizontal pixel neighbor, and preferably, one vertical pixel neighbor are stored within the buffer 30. In addition, since most digital cameras take multiple images to ensure the exposure is correct before selecting the image to permanently store, one or more images may be stored in the buffer 3 at a time.

The demosaicing in the digital processing arrangement 4 result in three interpolated color planes C1', C2', C3', each containing the original values and interpolated values. The interpolated red, green and blue color planes C1', C2', C3' may be stored in a memory 5 until displayed or further processed. It should be noted that the color planes C1', C2', C3' may be compressed using any compression method prior to being stored in the memory 5. The compression method may be lossy but is preferably lossless, such as PNG compression or a block compression method. To display or process the compressed data on an output device 6 (e.g., a display, printer, computer, etc), the compressed data may be first decompressed before being provided to the output device 6. It is also conceivable that the raw data RD is also stored in memory 5 for subsequent retrieval.

The demosaicing, as well as all other methods disclosed herein, may be implemented by dedicated hardware in the digital processing arrangement 4, such as an ASIC (application specific integrated circuit) or an FPGA (field programmable gate array), optionally in combination with software instructions executed on a dedicated or generic processor. Alternatively, the demosaicing may be implemented purely by such software instructions. The processor for executing the software instructions may, e.g., be a microprocessor, microcontroller, DSP (digital signal processor), GPU (graphics processing unit), etc. The software instructions may be supplied on a computer-readable medium for execution by the processor in conjunction with an electronic memory in the digital processing arrangement 4. The computer-readable medium may be a tangible product (e.g. magnetic medium, optical disk, read-only memory, flash memory, etc) or a propagating signal.

Embodiments of the invention relate to methods and devices for demosaicing a mosaiced color image produced by a digital camera system having an image sensor with a color filter array (CFA). As discussed in the Background section, demosaicing involves estimating missing colors at each pixel in the color image. On a high level, demosaicing may be seen to involve a predefined color estimation function F, which operates on data in the local environment of the respective pixel to estimate a color value of each missing color. The color estimation function F may be applied in one pass, to operate on the color image pixel by pixel, or in multiple passes. The color estimation function F typically executes at least one interpolation among color values in the color plane of the missing color, and may also involve a correction function that modifies the result of the interpolation. The output of the color estimation function is thus an "interpolation value" for each missing color at each pixel in the color image.

Embodiments of the invention aim to improve the performance of existing demosaicing techniques, as well as enable new and improved demosaicing techniques. Depending on embodiment, the improved performance may relate to improved quality of the demosaiced image, increased processing speed, reduced processing cost, or any combination thereof.

Embodiments of the invention are based on the insight that such improvement may be achieved by determining the "structural instability" in a local region of the respective pixel and using the structural instability to modify the color estimation function F. As used herein, structural instability (SI) is a measure of the variability or roughness in the local region of the respective pixel. By incorporating SI in the color estimation function F, it is possible to increase the dynamics of the color estimation function and improve its ability to account for and adapt to the local surroundings of the respective pixel.

Typically, SI is computed at least once for every pixel in the mosaiced image, and it is desirable to obtain SI at a minimum of operations. In the embodiments presented herein, the structural instability is obtained as the range of color values in the local region of the respective pixel. The range is a well-known and simple measure that may be computed in an efficient way. Specifically, the range of a set of data is given by the difference between the largest and smallest values in this set. Thus, in embodiments of the invention, the structural instability for a set of n color values $\{s_0, \ldots, s_{n-1}\}$ is given by:

$$SI = MAX(s_0, \ldots, s_{n-1}) - MIN(s_0, \ldots, s_{n-1}), \quad (1)$$

where MAX and MIN are functions for determining the maximum value and the minimum value, respectively, in the set of values. For example, if each color is defined by 8 bits in the mosaiced image, SI has a value between 0 and 255.

Figure 4:
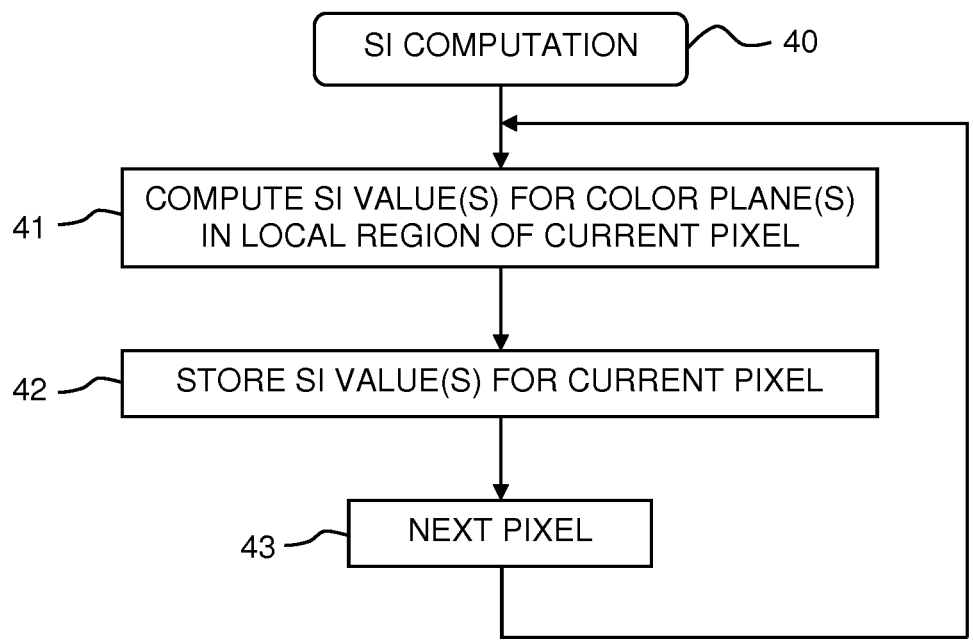
FIG. 4 is a flow chart of a method for computation of SI values.

FIG. 4 is a flow chart of a generic method 40 for computing SI values within a mosaiced image. The method may be performed in preparation of or in parallel with the actual demosaicing of the mosaiced image. The method 40 operates on the mosaiced image pixel by pixel. In step 41, one or more SI values are computed in the local region of the current pixel in a respective color plane, according to Eq. 1 above. Each SI value thereby represents the structural instability in one of the color planes C1-C3 in the neighborhood of the current pixel. In step 42, the one or more SI values are stored in electronic memory (e.g. buffer 3 or memory 5 in FIG. 1) for the current pixel. The association between SI value and pixel may be implicit or explicit in the memory. In step 43, the method proceeds to the next pixel in the mosaiced image.

Figure 5:
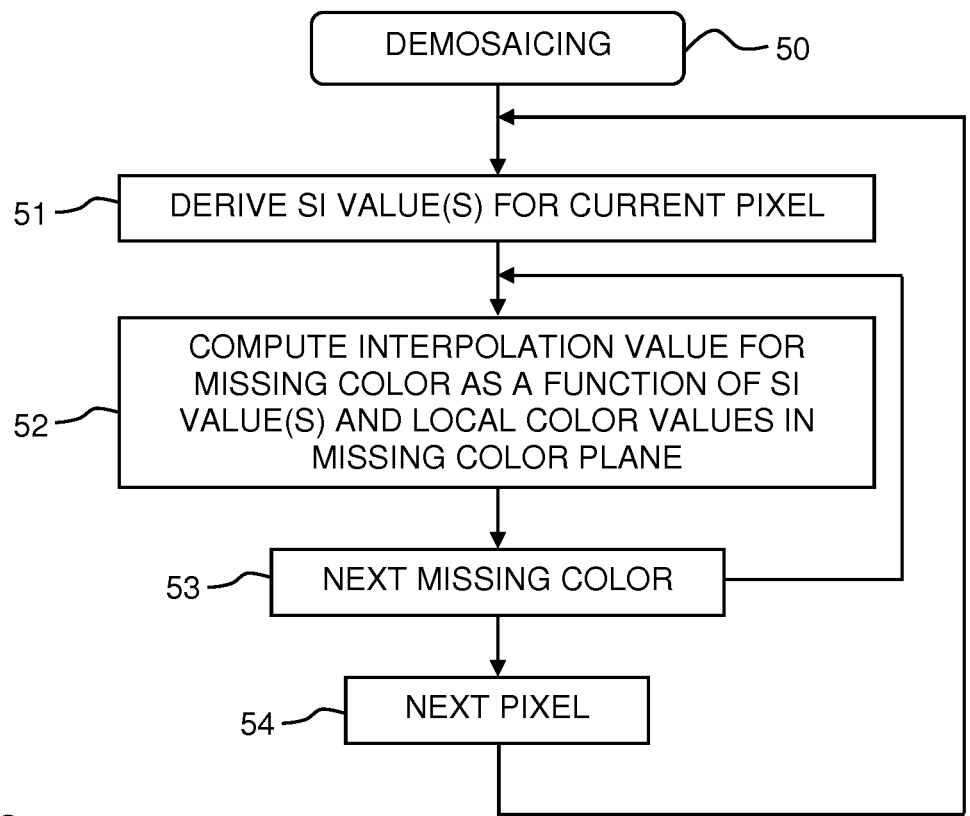
FIG. 5 is a flow chart of a method for demosaicing a digital image by use of SI values.

FIG. 5 is a flow chart of a generic method 50 for demosaicing a mosaiced image using SI values, e.g. computed by method 40. The method 50 operates on the mosaiced image pixel by pixel. Basically, the method 50 modifies a predefined color estimation function F, which is used for calculating an interpolation value for a current pixel, based on one or more SI value(s) for the current pixel.

In step 51, one or more SI values for the current pixel are derived from electronic memory, in which the SI values have been previously stored by method 40. In an alternative implementation, method 40 is omitted and step 51 implements step 41 to compute the one or more SI values for the current pixel. As will be shown in relation to detailed examples below, the one or more SI values derived in step 51 may represent the existing (i.e. current) color at the current pixel and/or a missing color at the current pixel. In step 52, an interpolation value is computed for one of the missing colors at the current pixel as a function of SI value(s) derived in step 51 and local color values in the color plane of the missing color. The color value for the missing color is then set to the interpolation value. As will be shown in relation to detailed examples below, step 52 may use further data when computing the interpolation value, such as local color values in the color plane of the current color at the current pixel.

As understood from the foregoing, step 52 computes the interpolation value for color values in a local region of the current pixel. The local region used in step 52 may (but need not) differ from the local region used in step 41/51 for computing the SI value(s). To differentiate between these local regions in the following description, the local regions used for computing SI values in step 41/51 are designated "first local regions", and local regions used for computing the interpolation values in step 52 are designated "second local regions".

In step 53, the method proceeds to compute an interpolation value for the next missing color at the current pixel, by executing step 52. In step 54, method proceeds to the next pixel in the mosaiced image.

Step 52 may be configured in many different ways to use the SI value(s) for improving the computation of the interpolation value. For example, in demosaicing techniques that interpolate only information in a single color plane, i.e. the color plane of the respective missing color, the SI value(s) may be used for modifying the extent of the interpolation function within the second local region and/or for modifying interpolation coefficients used for combining color values into the interpolation value, so as to improve the quality of the demosaiced image. Such an embodiment will be presented in detail below for Lanczos interpolation with reference to FIGS. 9-10. Similarly, the smooth hue transition interpolation discussed in the Background section may be modified to take into account SI value(s), e.g. by modifying the interpolation function used to interpolate among the green pixels and/or by modifying the interpolation function used for interpolating the hue values. It is also conceivable to combine different interpolation techniques that operate in a single color plane, by a respective interpolation function, and use the SI value(s) to either select one of the interpolation function for computing the interpolation value at the current pixel or to determine one or more weight coefficients for combining the results of the interpolation functions into the interpolation value of the current pixel, so as to improve the quality of the demosaiced image. In demosaicing techniques that use information from plural color planes to compute the interpolation value of the current pixel, the SI value(s) may be used to determine one or more weight coefficients for combining the results of the computations for the respective color plane, so as to improve the quality of the demosaiced image. Such an embodiment will be presented in detail below for gradient-corrected bilinear interpolation with reference to FIGS. 7-8. The SI value(s) may also be used to selectively exclude or include processing operations in demosaicing techniques. For example, in the adaptive demosaicing techniques discussed in the Background section, the SI value(s) may be used as an effective metric to assess the presence of local spatial features in the second local region (e.g. horizontal, vertical or diagonal gradients). If the SI value is low, this means that the related color plane is comparatively smooth in the neighborhood of the current pixel and thus that significant gradients are unlikely to be present in this neighborhood. The demosaicing algorithm may thus be configured to refrain from detecting local spatial features when the SI value is sufficiently low and thereby reduce the number of processing operations without compromising the quality of the demosaiced image.

Figure 6:
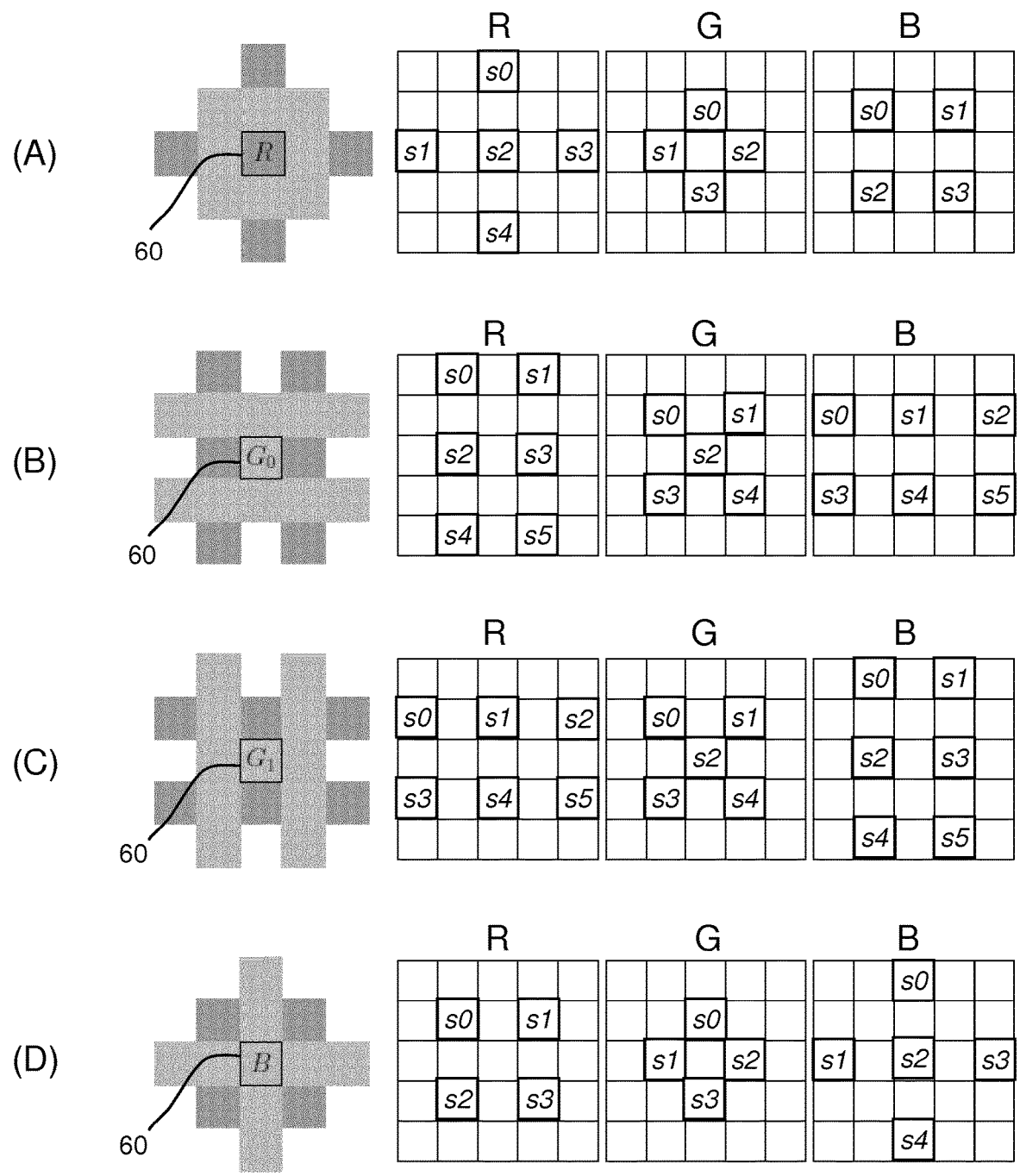
FIGS. 6(A)-6(D) illustrate the location of red, green and blue pixels within a first local region centered on a current pixel, depending on the color of the current pixel.

It is preferable that each SI value represents color values in two dimensions around the current pixel. For reasons of processing efficiency, it may also be preferable to implement step 41 in FIG. 4 to use first local regions that are coherent, fixed and predefined with respect to the current pixel. It can be shown that for images produced by an image sensor with a Bayer CFA, these requirements are fulfilled provided that the first local regions comprise at least 5×5 pixels and are centered on the current pixel. Thus, a first local region of 5×5 pixels yields the shortest distance to the center value (i.e. the current pixel) with two degrees of freedom in the respective color plane and symmetry with respect to the center value. FIG. 6 shows the location of the red (R), green (G) and blue (B) color values within a first local region of 5×5 pixels depending on the current color at the current pixel 60. Specifically, in FIG. 6(A) the center pixel 60 is red (R), in FIG. 6(B) the center pixel 60 is green (G0), in FIG. 6(C) the center pixel 60 is green (G1) and in FIG. 6(D) the center pixel 60 is blue (B). Thus, step 41 may be configured to compute the SI value for a specific current color at the current pixel 60 and a specific color plane (R, G, B) based on the respective set of color values $\{s_0, \ldots, s_{n-1}\}$ indicated in FIG. 6. It is understood that the digital processing arrangement 4 (FIG. 1) may be programmed or configured to efficiently perform step 41 based on the data in FIG. 6.

The first local region may be larger than 5×5 pixels, e.g. 7×7 pixels, but it is currently believed that this may increase the blurriness of the demosaiced image. If the first local region is smaller than 5×5 pixels, which is possible, at least some SI values will not represent neighboring pixels located symmetrically in two dimensions to the current pixel, as understood from FIG. 6.

The general method of FIG. 5 will now be further exemplified in relation to a number of embodiments that involve SI-based modification of established demosaicing techniques.

A first embodiment is an improvement of a gradient-corrected bilinear interpolation disclosed in the article "High-quality linear interpolation for demosaicing of Bayer-patterned color images", by Malvar et al, published in ICASPP, 2004, and further exemplified in above-mentioned US2005/0201616, both of which are incorporated herein by reference. This demosaicing technique is well-known to the person skilled in the art and will not be described in great detail. On a general level, this demosaicing technique uses a color estimation function F, which is formed as a linear combination of an interpolation function F1, which operates on the color values for the pixels having the missing color within the second local region, and a correction function F2, which operates to generate a color correction value based on the color values of the pixels having the current color within the second local region. Specifically, the correction function F2 is designed to generate the color correction value based on the gradient in the color plane of the current color. For computational efficiency, the first and second functions F1, F2 are defined by linear FIR filter coefficients operating on color values with predefined locations within the second local region, where the filter coefficients are selected so that the first function F1 performs a bilinear interpolation.

The left-hand part of FIGS. 7(a)-7(H) illustrate second local regions with superimposed filter coefficients for computing a specific missing color of a current pixel having a specific current color. The current pixel is located at the center of the respective second local region. The white boxes designate predefined filter coefficients to be applied to pixels with the missing color, the colored boxes in the second local region designate predefined filter coefficients to be applied to pixels with the current color, and the black boxes designate pixels that have the other missing color and are not included in the computation of the specific missing color. Specifically, FIGS. 7(A)-7(H) illustrates the filter coefficients used for computing (A) the missing green color at a red pixel, (B) the missing green color at a blue pixel, (C) the missing red color at a green G0 pixel, (D) the missing red color at a green G1 pixel, (E) the missing blue color at a green G0 pixel, (F) the missing blue color at a green G1 pixel, (G) the missing red color at a blue pixel, and (H) the missing blue color at a red pixel.

The right-hand part of FIGS. 7(A)-(H) illustrates the pixels (color values) within the first local region that are used for computing the SI value of the missing color (second from right) and the SI value of the existing color the center pixel (furthest to the right). It is realized that these illustrations of the first local region correspond to the illustrations in FIG. 6.

Conventionally, the gradient-corrected bilinear interpolation technique generates the interpolated values M1, M2 for the respective missing color at the current pixel as:

$$\begin{cases} M1 = I_{M1} + CORR_{M1,C} \\ M2 = I_{M2} + CORR_{M2,C} \end{cases} \quad (2)$$

where $I_{M1}$ and $I_{M2}$ are the bilinear interpolation values produced by function F1 operating on the values of the respective missing color in the second local region, using the filter coefficients for the respective missing color given the current color according to FIGS. 7(A)-7(H), and $CORR_{M1,C}$ and $CORR_{M2,C}$ are the correction values produced by function F2 operating on the current color values in the second local region, using the filter coefficients for the current color given the respective missing color according to FIGS. 7(A)-7(H).

However, the first embodiment improves the conventional gradient-corrected bilinear interpolation technique by introducing an SI-dependent scaling factor into Eq. 2:

$$\begin{cases} M1 = I_{M1} + SCALE_{M1,C} \cdot CORR_{M1,C} \\ M2 = I_{M2} + SCALE_{M2,C} \cdot CORR_{M2,C} \end{cases} \quad (3)$$

where $SCALE_{M1,C}$, $SCALE_{M2,C}$ are factors clamped between 0.0 and 1.0 and given by:

$$\begin{cases} SCALE_{M1,C} = \min(1, \sqrt{SI_{M1}}/\sqrt{SI_C}) \\ SCALE_{M2,C} = \min(1, \sqrt{SI_{M2}}/\sqrt{SI_C}) \end{cases} \quad (4)$$

where $SI_{M1}$ and $SI_{M2}$ designate the structural instability computed for the respective missing color in the first local region given the current color of the current pixel, and $SI_C$ designates the structural instability computed for the current color in the first local region. To avoid computational problems when $SI_C$ is zero, or close to zero, a small constant ε may be added to $\sqrt{SI_C}$ in the denominator of Eq. 4. A proper value of the constant ε may be given by testing.

In Eq. 4, if $SI_C > SI_{M1}$ or $SI_C > SI_{M2}$, the respective scaling factor is less than 1, which means that the impact of the correction factor on the interpolated value M1, M2 is reduced. Recalling that the correction factor is computed in the current color plane, this means that the impact of the current color plane is reduced when the local structural instability is larger in the current color plane than the missing color plane. Conversely, if $SI_C < SI_{M1}$ or $SI_C < SI_{M2}$, the respective scaling factor is 1, which means that interpolated value M1, M2 is computed by the conventional gradient-corrected bilinear interpolation technique.

It should be noted that the relative measure of SI values may be otherwise defined. For example, the square roots may be omitted. The square roots are used to dampen the impact of variations, e.g. in $SI_C$. Alternatively, the respective square root may be replaced for any other dampening function, such as a logarithm in any base, a cubic root, etc.

The skilled person also realizes that the scaling factors in Eq. 4 may alternatively be computed based on a single SI value, representing either the current color plane or the missing color plane. However, this may require some form of calibration, which is obviated by using a ratio of SI values as in Eq. 4. If a single SI value is used, it may be advantageous to normalize the SI value, e.g. as a function of the bit depth (cf. normalization described further below).

Figure 7:
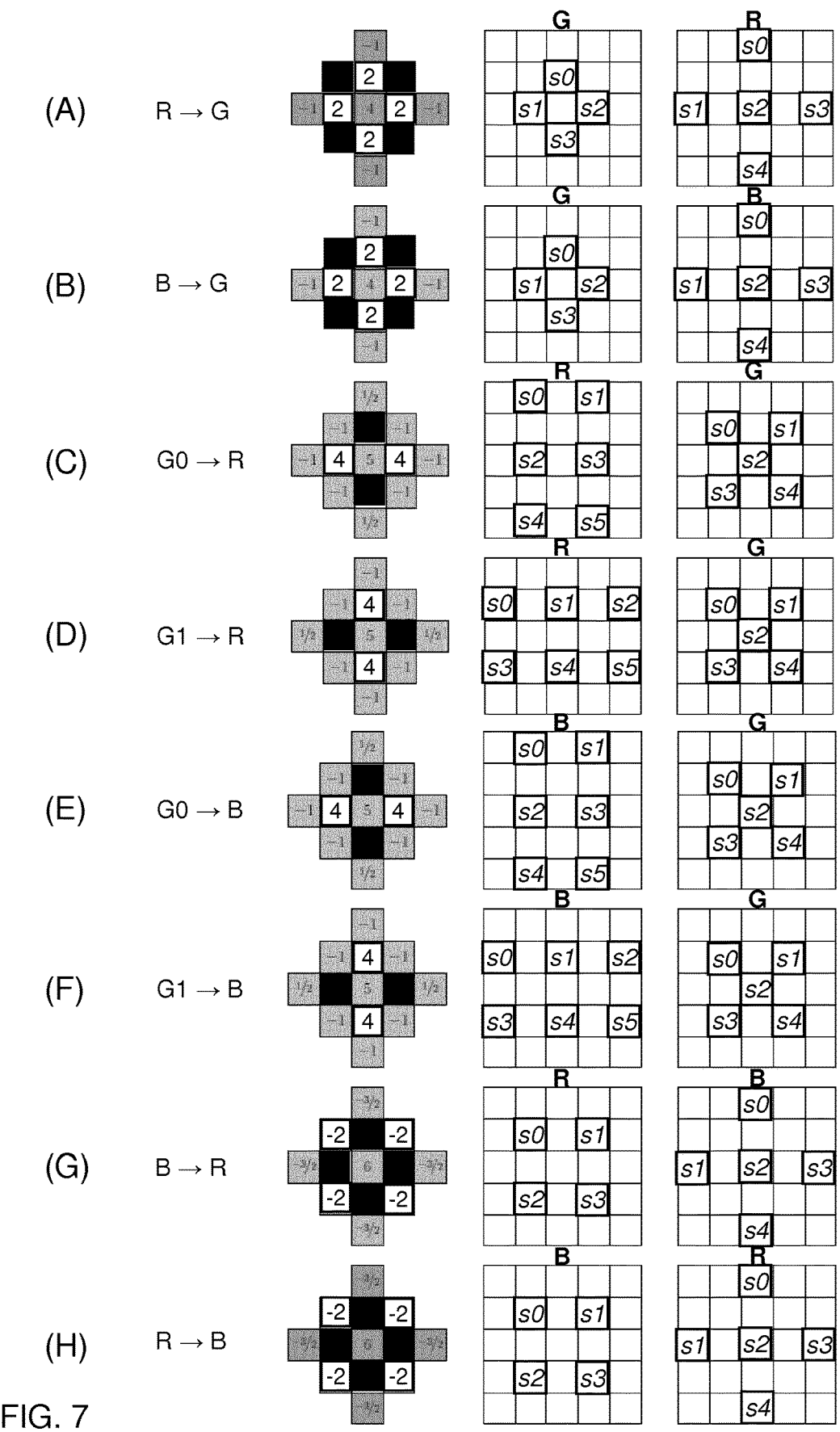
FIGS. 7(A)-7(H) each illustrate filter coefficients in a second local region for a respective combination of current color and missing color at the current pixel, and corresponding pixel locations in the first local region for the missing color and the current color.
Figure 8:
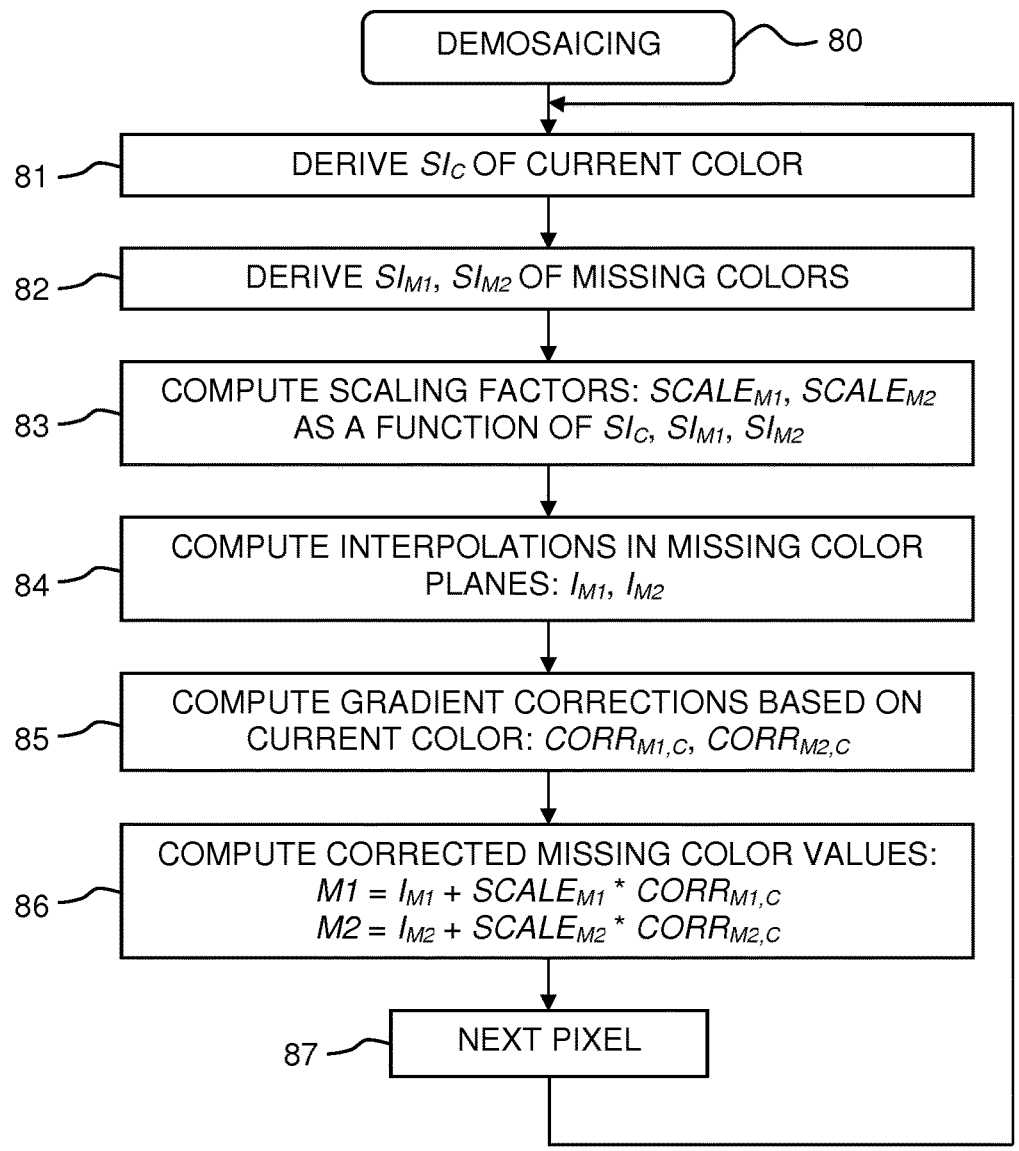
FIG. 8 is a flow chart of a method for demosaicing by gradient-corrected bilinear interpolation using the filter coefficients in FIGS. 7(A)-7(H) and SI values computed for the pixel locations in FIGS. 7(A)-7(H).

FIG. 8 is a flowchart of a demosaicing method 80 that implements the embodiment presented above with reference to FIG. 7. The method 80 operates on the mosaiced image pixel by pixel. In step 81, the SI value for the current color of the current pixel is derived (from electronic memory or computed on-the-fly). In step 82, the SI values for the missing colors are derived (from electronic memory or computed on-the-fly). In step 83, the scaling factors are computed according to Eq. 4. In step 84, function F1 is applied to compute interpolations in the respective missing color plane, using the appropriate color values and interpolation coefficients according to FIGS. 7(A)-7(H). In step 85, function F2 is applied to compute correction factors in the current color plane, using the appropriate color values and interpolation coefficients according to FIGS. 7(A)-7(H). In step 86, the interpolation values M1, M2 for the missing colors are computed according to Eq. 3. The interpolation values are stored as missing color values for the current pixel, and in step 87 the method proceeds to process the next pixel.

The demosaicing method in FIG. 8 has been applied to different sets of test images and compared with demosaicing methods using pure bilinear interpolation and the gradient-corrected bilinear interpolation, respectively. The outcome was evaluated by comparing the average PSNR (peak signal-to-noise ratio) in the respective color plane (R, G, B) for all demosaiced images, expressed in terms of decibel (dB). PSNR is a well-known and established metric for evaluating images, where an improvement of more than 0.5 dB is generally considered to be good and an improvement of more than 0.7 dB is considered to be very good.

The outcome for the so-called IMAX dataset (McMaster), using 18 different images with dimensions 500×500 pixels, is shown in Table 1. As seen, the demosaicing method 80 improves PSNR in all color planes by more than 0.8 dB compared to conventional gradient-corrected bilinear interpolation.

TABLE 1

| Pure bilinear | | | Gradient-corrected | | | Demosaicing method 80 | | |
|---|---|---|---|---|---|---|---|---|
| R | G | B | R | G | B | R | G | B |
| 31.69 | 35.40 | 31.25 | 34.05 | 37.61 | 33.02 | 34.91 | 39.07 | 33.90 |

A visual inspection of the demosaiced images also revealed that the demosaicing method 80 produced much less zipper effect than the conventional gradient-corrected bilinear interpolation, and less blur than pure bilinear interpolation.

The outcome for the TESTIMAGES archive provided by Tecnick, using 40 different images with dimensions 2448×2448 pixels is shown in Table 2. Again, the demosaicing method 80 improves PSNR in all color planes by more than 0.7 dB compared to conventional gradient-corrected bilinear interpolation.

TABLE 2

| Pure bilinear | | | Gradient-corrected | | | Demosaicing method 80 | | |
|---|---|---|---|---|---|---|---|---|
| R | G | B | R | G | B | R | G | B |
| 49.24 | 52.80 | 47.80 | 49.30 | 53.08 | 49.14 | 50.63 | 55.25 | 49.86 |

Differences in computation time have been evaluated by implementing the different demosaicing methods for execution purely in software on a state-of-art GPU, GeForce GTX 970. For an image size of 3072×2048 pixels, the demosaicing method 80 resulted in an increased computation time by 1.6% compared to conventional gradient-corrected bilinear interpolation, with optimal thread configuration for the respective method. For an image size of 7216×5412 pixels, the corresponding increase was 2.7%. It is concluded that the increase in computational cost is small compared to the improvement in image quality.

Figure 9:
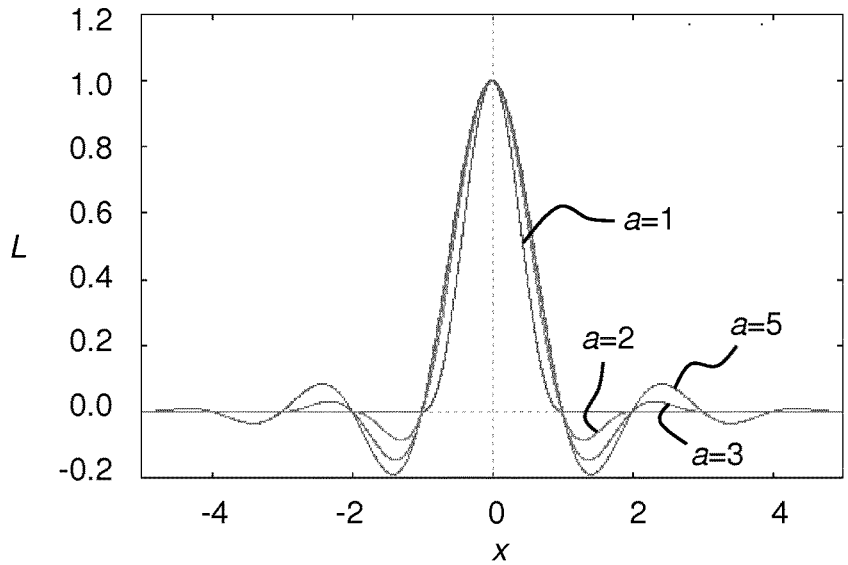
FIG. 9 is a plot of a Lanczos interpolation function for different values of a radius parameter.

A second embodiment that involves SI-based modification of an established demosaicing technique will now be described with reference to FIGS. 9-10. In the second embodiment, in contrast to the first embodiment, the color estimation function F operates only in the respective missing color plane of the current pixel and consists of a single interpolation function F1. Specifically, the second embodiment is based on demosaicing using so-called Lanczos interpolation within the second local region.

Lanczos interpolation is well-known to the person skilled in the art, and is e.g. described in the article "Lanczos filtering in one and two dimensions", by Duchon, published in Journal of Applied Meteorology, Vol. 8, 1016-1022, 1979, which is incorporated herein by reference.

In conventional Lanczos interpolation, given color values $S_{ij}$ of the respective missing color at integer points (i,j) in the second local region of the current pixel (located at i=0, j=0), the interpolated value M1 (missing color value) at the current pixel is given by:

$$M1 = \Sigma_i \ \Sigma_j \ s_{ij} \cdot L(i) \cdot L(j) \quad (5)$$

$$L(x) = \begin{cases} 1 & \text{if } x = 0 \\ a \cdot \sin(\pi \cdot x) \cdot \sin\left(\pi \cdot \frac{x}{a}\right)/\pi^2 \cdot x^2 & \text{if } 0 < |x| < a \\ 0 & \text{otherwise} \end{cases} \quad (6)$$

The interpolated value M2 is obtained by the same equations. In Eq. 5, $S_{ij}$ are the color values within the second local region for the missing color, L is the Lanczos kernel or function, and the summations ΣΣ are made for all combinations of integer points (i,j) of the missing color within the second local region. In Eq. 6, α is the radius of the Lanczos function within the second local region. It is understood that the integer points (i,j) differ depending on the current color of the current pixel (cf. the white boxes in the second local regions depicted in the left-hand part of FIG. 7).

In the second embodiment, the color estimation function F for computing the respective missing color at the current pixel is based on the above-described Lanczos interpolation, albeit modified to account for the SI value of the respective missing color at the current pixel. This SI-based modification may be based on different principles that account for the fact that a large SI value implies a high variability of the missing color within the first local region, and vice versa. According to a first principle, the interpolation function is modified to increase the impact of more distant missing color values on the estimated color value of the missing color. According to a second principle, the interpolation function is instead modified to increase the impact of the missing color values located closest to the current pixel on the estimated color value of the missing color. A third principle is to logically combine the first and second principles.

It is understood that the first to third principle may be implemented in different ways, as exemplified in the following.

In a first implementation of the second embodiment, the radius α of the interpolation function is modified based on the SI value. FIG. 9 is a plot of the Lanczos function L for different values of the radius α. As seen, the impact of more distant pixels on the interpolation value is increased with increasing radius α. The first principle may be implemented by increasing the radius α with increasing SI value. The second principle may be implemented by decreasing the radius α with increasing SI value. The third principle may be implemented by modifying the radius α according to a non-linear function of SI value. These implementations will further explained for specific examples, in which the radius α is set to a value between 2.0 and 3.0 as a function of the SI value.

In one example of the first implementation, the radius α is modified according to: α=2+SI/N, where SI is the SI value of the missing color (computed within the first local region according to FIG. 6), and N is a normalization factor representing the number of possible color values in the mosaiced image for the respective color and may be given by: $N=2^m-1$, where m is the bit depth in the respective color plane. The SI value is thereby normalized to a value between 0.0 and 1.0, and the radius α is linearly increased with increasing SI value in accordance with the first principle. Comparative tests indicate that this modification yields an improvement in PSNR compared to conventional Lanczos interpolation.

In another example of the first implementation, the radius α is modified according to: α=3−SI/N. Thus, the radius α is linearly decreased with increasing SI value, in accordance with the second principle. Comparative tests indicate that this modification also yields an improvement in PSNR compared to conventional Lanczos interpolation.

In a further example of the first implementation, the radius α is modified according to either the first example (linear increase) or the second increase (linear decrease), depending on an SI-based criterion, in accordance with the third principle. For example, the radius α may be linearly increased (e.g., α=2+SI/N) if SI/N falls within a first interval, and linearly decreased (e.g., α=3−SI/N) if SI/N falls within a second interval. For example, the first interval may be 0.0≤SI/N<0.5, and the second interval may be 0.5≤SI/N≤1.0.

In the first implementation of the second embodiment, to estimate a missing color at a current pixel, the radius α is first computed as a function of the SI value for the missing color and then used for computing the interpolation coefficients L at the pixels having the missing color within the second local region, in accordance with Eq. 6, whereupon the missing color is computed in accordance with Eq. 5. Thus, the radius α and the interpolation coefficients L are computed on-the-fly for each missing color at each current pixel in the mosaiced image. From a computational point of view, the color estimation function F uses a fixed second local region and modifies the radius of the interpolation function within the second local region. In the foregoing example with α=[2, 3], the second local region is given by a group of 7×7 pixels centered on the current pixel.

In a second implementation of the second embodiment, the interpolation coefficients L are instead pre-computed for a predefined radius α and stored in memory (e.g. buffer 3 or memory 5 in FIG. 1), and the SI value is applied to modify the interpolation coefficients at the pixels having the missing color within the second local region, in accordance with any one of the first, second and third principles. Thus, the interpolation coefficients may be modified to increase the contribution of more distant pixels with increasing SI value (first principle), decrease the contribution of more distant pixels with increasing SI value (second principle), or logically combine the first and second principles.

In the second implementation of the second embodiment, to estimate a missing color at a current pixel, the interpolation coefficients L for the pixels having the missing color within the second local region are retrieved from memory, and each L coefficient is scaled appropriately based on its distance to the current pixel and as a function of the SI value of the missing color, whereupon the missing color is computed in accordance with Eq. 5.

Figure 10:
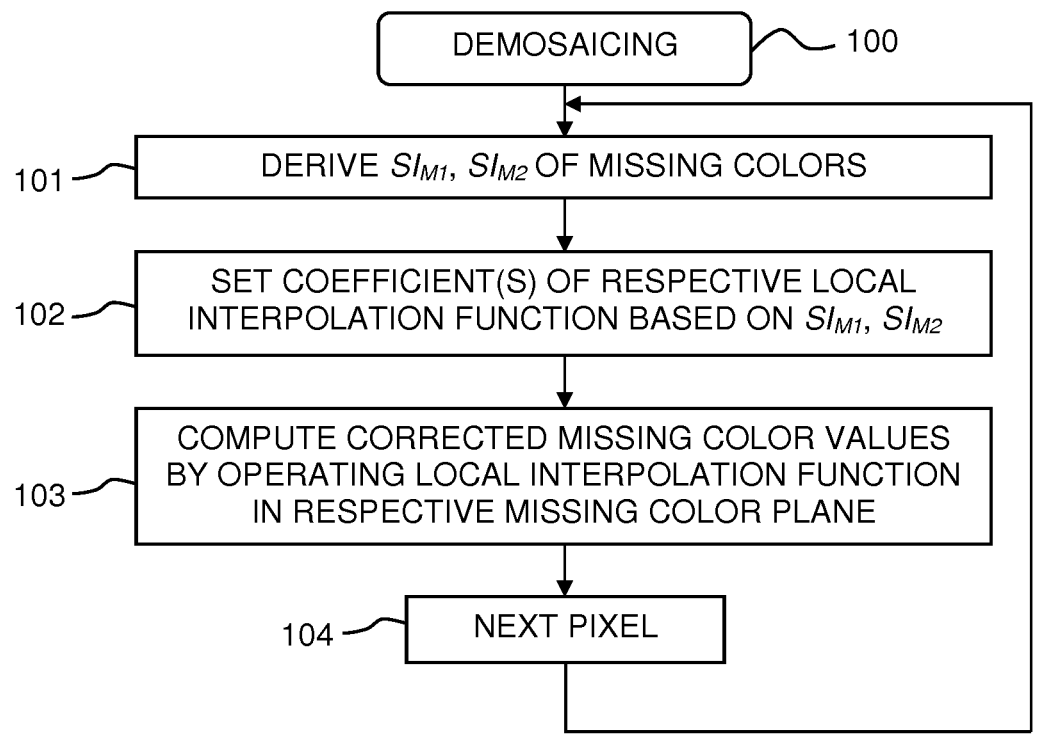
FIG. 10 is a flow chart of a method for demosaicing by Lanczos interpolation modified by SI values.

FIG. 10 is a flowchart of a demosaicing method 100 that implements an SI-based Lanczos interpolation as described in the foregoing. The method 100 operates on the mosaiced image pixel by pixel. In step 101, the SI values for the missing colors at the current pixel are derived (from electronic memory or computed on-the-fly). In step 102, the interpolation coefficients of the interpolation function for the respective missing color are set based on the respective SI value. In the first example discussed above, the interpolation coefficients are computed on-the-fly based on a radius parameter $\alpha$, which is set for the respective missing color as a function of the corresponding SI value. In the second example discussed above, pre-computed interpolation coefficients are retrieved from electronic memory and selectively modified as a function of their distance to the current pixel and as a function of the SI value. In step 103, the interpolation values M1, M2 for the missing colors are computed according to Eq. 5. In step 104, the method proceeds to process the next pixel.

It is to be understood that the principles of the second embodiment are not limited to Lanczos interpolation but may be applied to any other type of interpolation function, including both linear and non-linear interpolation functions.

The invention claimed is:

1. A computer-implemented method for interpolating a missing color at a current pixel in a color image produced by a digital image sensor having a color filter array, the current pixel having a current color that differs from the missing color, said method comprising:
computing a range value for color values of pixels within a first local region around and including the current pixel, said range value being computed for one of: pixels having the missing color and pixels having the current color,
computing an interpolation value at the current pixel as a function of the range value and color values for pixels having the missing color within a second local region around the current pixel, and
setting the missing color at the current pixel to the interpolation value.

2. The computer-implemented method of claim 1, wherein computing the range value comprises: identifying a largest color value and a smallest color value among the color values for the pixels within the first local region, and computing a difference between the largest and smallest color values.

3. The computer-implemented method of claim 1, wherein the interpolation value is computed by a predefined color estimation function which is modified based on the range value.

4. The computer-implemented method of claim 3, wherein the predefined color estimation function comprises an interpolation function operating on the color values for the pixels having the missing color within the second local region.

5. The computer-implemented method of claim 4, wherein the predefined color estimation function further comprises a correction function which is combined with the interpolation function and operates to generate a color correction value, wherein the range value is applied to modify the color correction value or the correction function.

6. The computer-implemented method of claim 5, wherein the correction function operates to generate the color correction value based on the color values of the pixels having the current color within the second local region.

7. The computer-implemented method of claim 5, wherein the correction function operates to estimate a color gradient for the current color within the second local region.

8. The computer-implemented method of claim 5, wherein computing the range value comprises: computing a first range value as a function of the color values for the pixels having the missing color within the first local region, and computing a second range value as a function of the color values for the pixels having the current color within the first local region, and wherein the color correction value or the correction function is modified as a function of the first and second range values.

9. The computer-implemented method of claim 8, wherein the color correction value or the correction function is modified as a function of a ratio of the first and second range values.

10. The computer-implemented method of claim 9, wherein the color correction value is modified by a scaling factor given by the smallest of 1 and a value representing the ratio of the first and second range values.

11. The computer-implemented method of claim 4, wherein the range value is applied to modify the interpolation function.

12. The computer-implemented method of claim 11, wherein the interpolation function operates to combine the color values for the pixels having the missing color within the second local region using interpolation coefficients, and wherein one or more of the interpolation coefficients are modified as a function of the range value.

13. The computer-implemented method of claim 11, wherein the extent of interpolation function within the second local region is modified as a function of the range value.

14. The computer-implemented method of claim 3, wherein the predefined color estimation function operates to, as a function of the range value, select between different interpolation functions for computing the interpolation value at the current pixel, and/or selectively include or exclude processing operations when computing the interpolation value at the current pixel.

15. The computer-implemented method of claim 1, wherein each of the first and second local regions have a predefined extent and are centered at the current pixel.

16. The computer-implemented method of claim 1, wherein the color image is a Bayer image.

17. A computer-readable medium comprising computer instructions for interpolating a missing color at a current pixel in a color image produced by a digital image sensor having a color filter array, the current pixel having a current color that differs from the missing color, the computer instructions, when executed by a processor, cause the processor to:
compute a range value for color values of pixels within a first local region around and including the current pixel, said range value being computed for one of: pixels having the missing color and pixels having the current color, compute an interpolation value at the current pixel as a function of the range value and color values for pixels having the missing color within a second local region around the current pixel, and set the missing color at the current pixel to the interpolation value.

18. A device for interpolating a missing color at a current pixel in a color image produced by a digital image sensor having a color filter array, the current pixel having a current color that differs from the missing color, said device being configured to:

compute a range value for color values of pixels within a first local region around and including the current pixel, said range value being computed for one of: pixels having the missing color and pixels having the current color, compute an interpolation value at the current pixel as a function of the range value and color values for pixels having the missing color within a second local region around the current pixel, and set the missing color at the current pixel to the interpolation value.

* * * * *